United States Patent [19]

Okada

[11] Patent Number: 5,151,042
[45] Date of Patent: Sep. 29, 1992

[54] ROTARY CONNECTOR

[75] Inventor: Tetsuya Okada, Tokyo, Japan

[73] Assignee: The Furukawa Electric Co., Ltd., Tokyo, Japan

[21] Appl. No.: 767,020

[22] Filed: Sep. 27, 1991

[30] Foreign Application Priority Data

Oct. 2, 1990 [JP] Japan .................... 2-103833[U]

[51] Int. Cl.$^5$ ............................................ H01R 39/02
[52] U.S. Cl. ....................................... 439/169; 439/15
[58] Field of Search ................................ 439/15, 169

[56] References Cited

U.S. PATENT DOCUMENTS 4,417,775 11/1983 Sakurai et al. .................... 439/15 X
4,813,878 3/1989 Schauer .

FOREIGN PATENT DOCUMENTS 0387585 9/1980 Fed. Rep. of Germany .
3641706 6/1988 Fed. Rep. of Germany .

Primary Examiner—Eugene F. Desmond
Attorney, Agent, or Firm—Frishauf, Holtz, Goodman & Woodward

[57] ABSTRACT

A rotary connector which includes a fixed case and a rotatable case, each having an opening for connection with a lead wire, a belt-like flat cable spirally wound and housed within the fixed and rotatable cases, the flat cable having a plurality of electrical conductors, and a connection terminal having one end connected to the electrical conductors of the flat cable and the other end connected to the lead wire and arranged at the opening of the rotatable case, wherein the flat cable is allowed to loosen and tighten to thereby permit the rotatable case to rotate relative to the fixed case. The rotary connector further comprises a fixing member attached to the lead wire, and a retaining member arranged at the opening of the rotatable case for engagement with the fixing member. The retaining member has a retaining portion for holding the lead wire in a predetermined position relative to the connection terminal.

5 Claims, 4 Drawing Sheets

ROTARY CONNECTOR

BACKGROUND OF THE INVENTION

1. Field of the Invention

The present invention relates to a rotary connector for connecting relatively rotatable members.

2. Description of the Related Art

Among various rotary connectors for connecting relatively rotatable members, a rotary connector for an automotive air bag is well known, for example. This type of a rotary connector has relatively rotatable fixed and rotatable cases and a flat cable loosely wound in spiral form and housed in the cases, and loosening and tightening of the flat cable permit the rotatable case to rotate relatively to the fixed case.

The flat cable includes a plurality of parallel conductors covered with an insulating material, and the inner and outer ends of the spirally wound cable are each bent and extended through the opening of the respective case to outside, or the conductors are connected to one end of a connection terminal arranged at the opening of the respective case. A lead wire connected to an external device or the like is connected to the other end of the connection terminal by means of welding or the like, and the connected portion is molded, using a synthetic resin, so that the flat cable may be protected from a tensile stress acting on the connected portion.

The conductors of the flat cable are, however, flat and thin and their strength against a bending force is not very high. Therefore, when the flat cable is bent, disconnection of the conductors sometimes occurs.

The connection of the lead wire to the connection terminal and the molding of the connected portion are preferably carried out after the flat cable is housed within the cases, for readiness of operation. If, in this case, the lead wire fails to be held in a predetermined position, however, the position for connection of the connection terminal and the lead wire is shifted due to a tensile stress acting on the lead wire. As a result, the connection terminal and the lead wire cannot be securely connected and the strength of the flat cable is reduced at the connected portion. Moreover, even after the connected portion is molded using a synthetic resin, its strength against a tensile stress acting on the lead wire cannot be sufficiently high for every occasion.

SUMMARY OF THE INVENTION

An object of the present invention is to provide a rotary connector of which the connected portion of a connection terminal and a lead wire has high tensile strength.

To achieve the above object, a rotary connector according to the present invention includes a fixed case and a rotatable case each having an opening for connection with a lead wire, a flat cable spirally wound and housed in the fixed and rotatable cases, the flat cable having a plurality of electrical conductors, and a connection terminal having one end connected to the electrical conductors of the flat cable and another end connected to the lead wire and arranged at the opening of the rotatable case, wherein the flat cable is allowed to loosen and tighten to thereby permit the rotatable case to rotate relatively to the fixed case. The rotary connector further comprises a fixing member attached to the lead wire, and a retaining member provided at the opening of the rotatable case for engaging with the fixing member, the retaining member having a retaining portion for holding the lead wire in a predetermined position relative to the connection terminal.

According to the rotary connector of the present invention, the retaining member holds at its retaining portion the lead wire in a predetermined position relative to the connection terminal, in cooperation with the fixing member. Therefore, the lead wire and the connection terminal can always be held in position, and thus, the connected portion thereof is protected from a tensile stress caused during the connection.

Accordingly, the connection terminal and the lead wire can be connected easily and firmly at a proper position, and the strength of the connected portion is increased.

Particularly, when the rotary connector is mounted to an automobile, the connected portion of the rotary connector is subject to tensile stress. Thus, an increased strength of the connected portion serves to protect the connected portion from the tensile stress during mounting.

The above and other objects, features, and advantages of the present invention will become apparent from the ensuing detailed description taken in conjuction with the accompanying drawings.

DETAILED DESCRIPTION OF THE PREFERRED EMBODIMENT

An embodiment of the present invention will be described in detail with reference to FIGS. 1 through 7.

Figure 1:
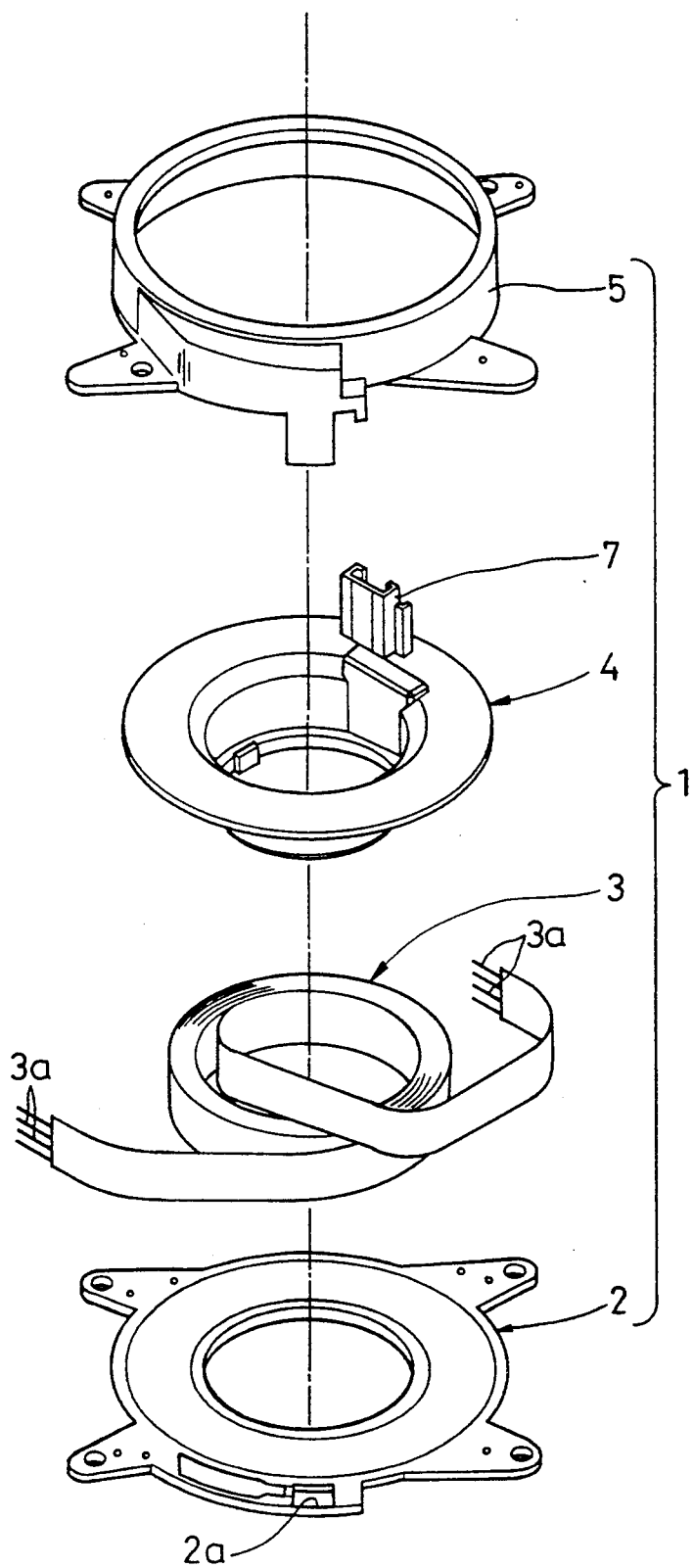
FIG. 1 is an exploded perspective view of a rotary connector according to one embodiment of the present invention, showing how the connector is assembled.

As shown in FIG. 1, a rotary connector 1 comprises a base plate 2, a spirally wound flat cable 3, an inner cylindrical case 4, and an outer cylindrical case 5, which are put one upon the other in the order mentioned. The base plate 2 and the outer cylindrical case 5 constitute a fixed case and the inner cylindrical case 4 serves as a rotatable case, each of the members 2, 5, and 4 being produced by molding a synthetic resin.

Conductors 3a at each end of the flat cable 3 are exposed, and a connection terminal is connected to each of the conductors 3a. Of these connection terminals, the connection terminals 6 at the inner end of the cable are passed upward (as viewed in FIG. 2) through an opening 4b in an outer peripheral portion of a flange 4a of the inner cylindrical case 4, and the connection terminals (not shown) at the outer end of the cable are passed downward through an opening 2a of the base plate 2.

Figure 2:
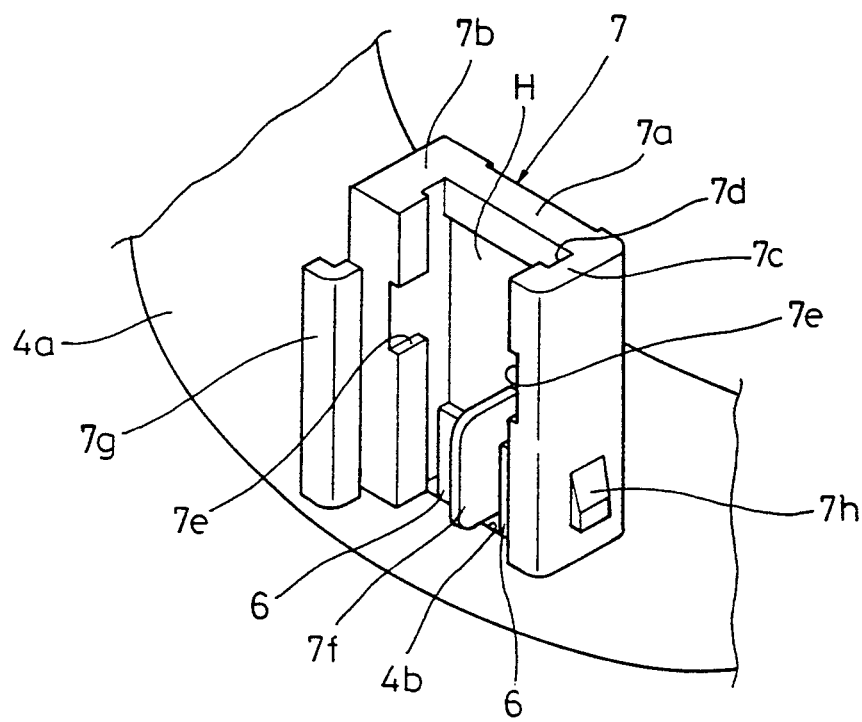
FIG. 2 is a perspective view of a retainer.

A retainer 7 is formed integrally with the flange 4a of the inner cylindrical case 4 and extends upward, as viewed in the figures, so as to surround the opening 4b. As shown in FIG. 2, the retainer 7 is a channel-like member having a supporting wall 7a and side walls 7b and 7c on opposite sides thereof, thus defining a vertically extending groove 7d which faces radially outward and into which lead wires are inserted. Retaining grooves 7e, which are horizontally located, are cut in substantially vertically middle portions of the side walls 7b and 7c, respectively. A recess H is formed in the inner surface of the supporting wall 7a, and a partition wall 7f, located at a lower portion of the recess H, projects toward the groove 7d for separating the connection terminals 6 from each other. A vertically extending guide 7g for guiding a post cover 11, mentioned later, is formed on the side wall 7b at the outer periphery side of the inner cylindrical case 4, and an engaging protuberance 7h for engaging with an engaging hole 11b of the post cover 11 is formed on the side wall 7c.

According to the rotary connector 1 of the present invention, the retainer 7 is formed on the inner cylindrical case 4 serving as a rotatable case, as described above. The retainer 7 is used when the rotary connector 1 is assembled. More specifically, the retainer 7 is used in the following manner when the lead wires 8 are connected respectively to the connection terminals 6 by welding after the base plate 2, the inner cylindrical case 4, and the outer cylindrical case 5 are put together with the flat cable 3 contained therein, as shown in FIG. 1.

Figure 3:
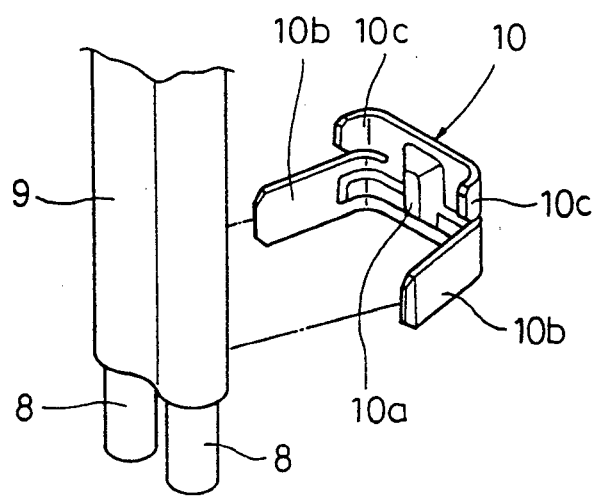
FIG. 3 is a perspective view showing how a fixture is attached to lead wires.

First, as shown in FIG. 3, the lead wires 8 are covered with an insulating tube 9, and are securely embraced by a fixture 10.

The fixture 10 serves to hold the lead wires 8 with a pitch thereof maintained at a constant value, and to bring the lead wires into a predetermined position relative to the respective connection terminals 6 when fitted into the retainer 7. As shown in FIG. 3, the fixture 10 has a retaining protuberance 10a for maintaining the pitch of the lead wires 8 constant, clamping tabs 10b, and engaging tabs 10c. A single lead wire, instead of the illustrated example, may be used, and in this case, the lead wire is positioned with respect to the connection terminals 6 simply by fitting the fixture 10 into the retainer 7.

Figure 4:
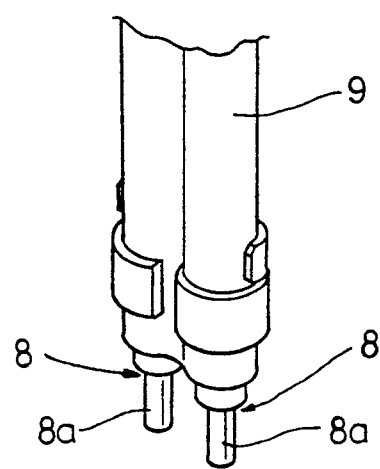
FIG. 4 is a perspective view showing a state in which the fixture is attached to the lead wires.

After conductors 8a at the ends of the lead wires 8 are exposed, the clamping tabs 10b are bent such that the lead wires 8 and the insulating tube 9 are held tight, as shown in FIG. 4.

Figure 5:
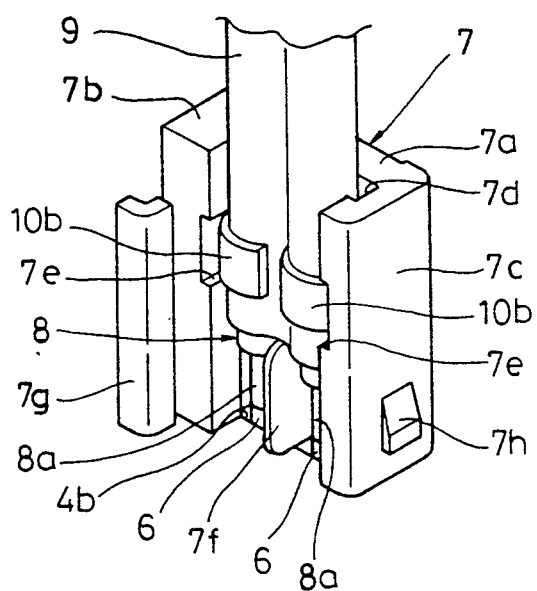
FIG. 5 is a perspective view showing a state in which the lead wires of FIG. 4 are fitted into the retainer.

Subsequently, the clamping tabs 10b are engaged with the retaining groove 7e of the retainer 7 and the engaging tabs 10c are fitted into the recess H. Then, as shown in FIG. 5, the lead wires 8, tightly held by the fixture 10, are fitted along the groove 7d of the retainer 7. In this case, the lead wires 8 are separated from each other by the partition wall 7f projecting from the lower portion of the supporting wall 7a, and therefore, the exposed conductors 8a at the wire ends do not interfere with each other.

FIG. 5 and the following drawings illustrate only the retainer 7, and the inner cylindrical case 4 is omitted.

Next, the exposed conductors 8a are welded to the respective connection terminals 6, whereby the lead wires 8 are connected to the respective connection terminals 6. In this case, since the lead wires 8 are each held in a predetermined position relative to the connection terminals 6 by the fixture 10, a situation that the position for welding of the connection terminals 6 and the lead wires 8 is shifted due to the tensile stress acting on the lead wires 8 during welding is eliminated, and the lead wires 8 and the terminals 6 can be reliably connected.

Figure 6:
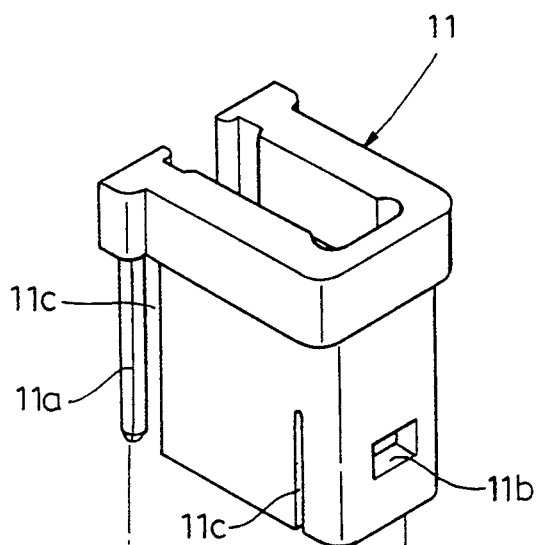
FIG. 6 is a perspective view showing how a post cover is fitted on the retainer of FIG. 5.
Figure 6:
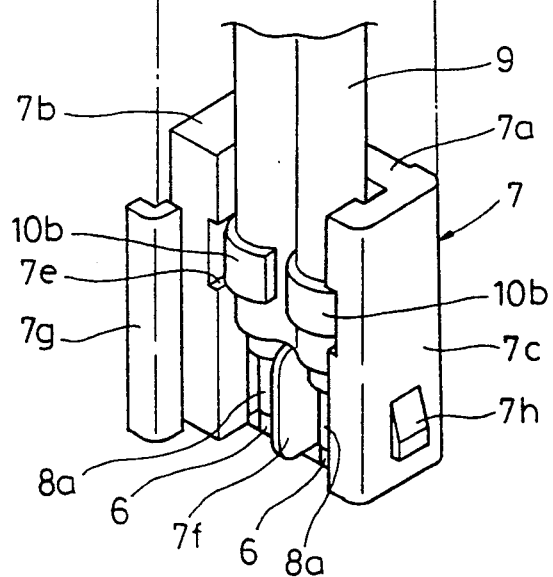
Figure 7:
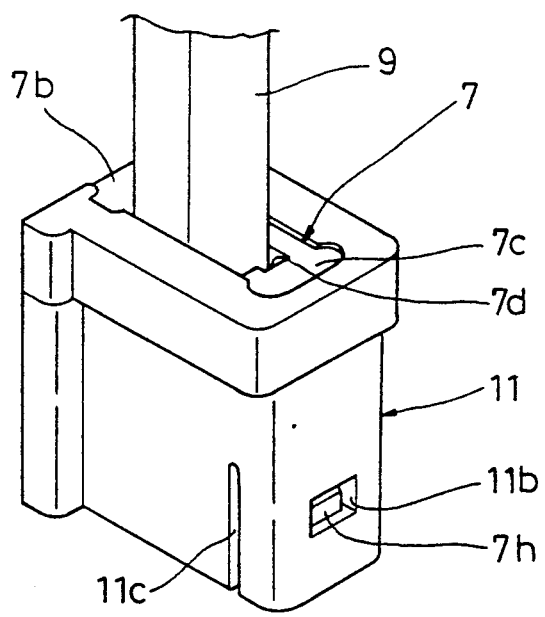
FIG. 7 is a perspective view showing a state in which the retainer and the post cover are put together.

Thereafter, as shown in FIG. 6, the post cover 11 is fitted on the retainer 7 from above along the lead wires 8, such that the post cover 11 surrounds the retainer 7, as shown in FIG. 7. The post cover 11, which is U-shaped when viewed from above, covers the connected portions of the terminals 6 and lead wires 8, and has a rail 11a for engagement with the guide 7g of the retainer 7 and the aforementioned engaging hole 11b for engagement with the engaging protuberance 7h. A plurality of slits 11c are cut in the wall in order to impart elasticity to the cover 11.

The rotary connector 1 is assembled in the above-described manner, and the wound flat cable 3 of the rotary connector 1 is allowed to loosen and tighten to thereby permit a predetermined number of rotations of the inner cylindrical case 4 relative to the base plate 2 and the outer cylindrical case 5.

In the above-described embodiment, the retainer is formed integrally with the inner cylindrical case, but may be separate therefrom. In this case, the retainer may be fitted into an opening in the inner cylindrical case or bonded to the case by an adhesive.

What is claimed is:

1. In a rotary connector including a fixed case and a rotatable case, each case having an opening for connection with at least one lead wire; a flat cable spirally wound and housed in the fixed and rotatable cases, the flat cable having a plurality of electrical conductors; and a connection terminal having one end connected to the electrical conductors of the flat cable and another end connected to the at least one lead wire and arranged at the opening of the rotatable case; the flat cable being arranged in said cases so as to loosen and tighten to thereby permit the rotatable case to rotate relatively to the fixed case, the improvement comprising:

a fixing member attached to the at least one lead wire; and a retaining member arranged at the opening of the rotatable case for engagement with the fixing member, the retaining member having a retaining portion for holding the at least one lead wire in a predetermined position relative to the connection terminal; and the fixing member having a clamping tab for holding the at least one lead wire and engaging with the retaining portion of the retaining member, and an engaging tab engaged with the retaining member for resisting a tensile force acting on the at least one lead wire.

2. A rotary connector according to claim 1, wherein the retaining member surrounds the opening of the rotatable case.

3. In a rotary connector including a fixed case and a rotatable case, each case having an opening for connection with at least one lead wire; a flat cable spirally wound and housed in the fixed and rotatable cases, the flat cable having a plurality of electrical conductors; and a connection terminal having one end connected to the electrical conductors of the flat cable and another end connected to the at least one lead wire and arranged at the opening of the rotatable case; the flat cable being arranged in said cases so as to loosen and tighten to thereby permit the rotatable case to rotate relatively to the fixed case, the improvement comprising:

a fixing member attached to the at least one lead wire; and a retaining member arranged at the opening of the rotatable case for engagement with the fixing member, the retaining member having a retaining portion for holding the at least one lead wire in a predetermined position relative to the connection terminal; and the retaining member being fitted into a cover which covers a connected portion of the at least one lead wire and the connection terminal.

4. A rotary connector according to claim 3, wherein the cover has a plurality of slits for providing elasticity.

5. A rotary connector according to claim 3, wherein the retaining member surrounds the opening of the rotatable case.

* * * * *